(12) United States Patent
Sato et al.

(10) Patent No.: US 9,790,884 B2
(45) Date of Patent: Oct. 17, 2017

(54) CONTROL SYSTEM AND CONTROL METHOD OF VEHICLE

(71) Applicant: TOYOTA JIDOSHA KABUSHIKI KAISHA, Toyota-shi, Aichi-ken (JP)

(72) Inventors: Hiroshi Sato, Nagoya (JP); Hiroaki Tabuchi, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/037,689

(22) PCT Filed: Nov. 14, 2014

(86) PCT No.: PCT/IB2014/002433
§ 371 (c)(1),
(2) Date: May 19, 2016

(87) PCT Pub. No.: WO2015/079295
PCT Pub. Date: Jun. 4, 2015

(65) Prior Publication Data
US 2016/0290270 A1 Oct. 6, 2016

(30) Foreign Application Priority Data
Nov. 26, 2013 (JP) ................................. 2013-244326

(51) Int. Cl.
F02N 11/08 (2006.01)
F02D 41/22 (2006.01)
(Continued)

(52) U.S. Cl.
CPC ............ *F02D 41/22* (2013.01); *F02D 41/042* (2013.01); *F02D 41/26* (2013.01);
(Continued)

(58) Field of Classification Search
CPC ............ F02N 11/0814; F02N 11/0818; F02N 11/0825
(Continued)

(56) References Cited

U.S. PATENT DOCUMENTS 8,050,851 B2 * 11/2011 Aoki ..................... B60W 20/10
                                                          123/179.4
8,770,165 B2 *  7/2014 Mizuno .................. F02D 29/06
                                                          123/179.3
(Continued)

FOREIGN PATENT DOCUMENTS

CN      103026036 A    4/2013
DE   102010062412 A1   9/2011
(Continued)

*Primary Examiner* — Erick Solis
(74) *Attorney, Agent, or Firm* — Oliff PLC

(57) ABSTRACT

A control system of a vehicle includes an electronic control unit. The electronic control unit is configured to (a) measure characteristics of a battery installed on the vehicle, (b) determine whether the battery is a designated battery or a non-designated battery, based on at least one of the characteristics, and (c) determine whether an idling stop function of the vehicle is permitted to be executed, based on a threshold value of at least one of the characteristics of the battery. The threshold value is set to a first threshold value when the battery is determined as the designated battery, and set to a second threshold value that is different from the first threshold value when the battery is determined as the non-designated battery.

16 Claims, 11 Drawing Sheets

(51) Int. Cl.
*F02D 41/04* (2006.01)
*F02D 41/26* (2006.01)

(52) U.S. Cl.
CPC ...... *F02N 11/0818* (2013.01); *F02N 11/0825* (2013.01); *F02N 11/0862* (2013.01); *F02D 2200/503* (2013.01); *F02N 2200/06* (2013.01); *F02N 2200/063* (2013.01); *Y02T 10/48* (2013.01)

(58) Field of Classification Search
USPC ........................................ 701/112; 123/179.4
See application file for complete search history.

(56) References Cited

U.S. PATENT DOCUMENTS

| | | | | |
|---|---|---|---|---|
| 8,949,007 | B2* | 2/2015 | Mitsuyama | F02D 35/00 123/179.4 |
| 9,194,919 | B2* | 11/2015 | Uesaka | H01M 10/44 |
| 9,284,896 | B2* | 3/2016 | Atluru | F02D 35/0007 |
| 9,434,385 | B2* | 9/2016 | Miyashita | F02D 17/02 |
| 2011/0231122 | A1 | 9/2011 | Fabregas et al. | |
| 2012/0049786 | A1 | 3/2012 | Kurimoto | |
| 2013/0124072 | A1 | 5/2013 | Hirano | |
| 2014/0091739 | A1 | 4/2014 | Sato et al. | |
| 2014/0365099 | A1 | 12/2014 | Tochigi et al. | |

FOREIGN PATENT DOCUMENTS

| | | |
|---|---|---|
| EP | 2808521 A1 | 12/2014 |
| JP | 2009-013953 A | 1/2009 |
| JP | 2009-208639 A | 9/2009 |
| JP | 2011-056976 | 3/2011 |
| JP | 2012-050267 A | 3/2012 |
| JP | 2013-164017 A | 8/2013 |
| JP | 2014-070629 A | 4/2014 |
| WO | 2013/111178 A1 | 8/2013 |

* cited by examiner (3) BATTERY REPLACEMENT

CONTROL SYSTEM AND CONTROL METHOD OF VEHICLE

BACKGROUND OF THE INVENTION

1. Field of the Invention

The invention relates to a control system and a control method for controlling a vehicle equipped with an idling stop function.

2. Description of Related Art

In recent years, the idling stop function (which is also called "idle reduction") is widely used, for reduction of the fuel consumption of vehicles. According to a technology regarding the idling stop function, as disclosed in Japanese Patent Application Publication No. 2009-208639 (JP 2009-208639 A), for example, the type of a battery installed on a vehicle is determined based on characteristics of the battery, and the idling stop function is inhibited from being executed if it is determined that the battery installed on the vehicle is different from a battery for use in an idling stop vehicle.

SUMMARY OF THE INVENTION

However, according to the technology as described in JP 2009-208639 A, if it is determined that the battery installed on the vehicle is not a battery for use in an idling stop vehicle, the idling stop function is immediately inhibited from being executed, irrespective of what conditions the battery is currently in. Namely, even in a condition where the idling stop function can be executed within a range in which there is no problem in terms of the lifetime of the battery, execution of the idling stop function is uniformly inhibited, and the fuel consumption may not be reduced. If, on the other hand, execution of the idling stop function is permitted as is the case with the battery for use in the idling stop vehicle, when it is determined that the battery installed on the vehicle is not the battery for use in the idling stop vehicle, the lifetime of the battery may be shortened. Therefore, it has been desired to more appropriately control permission or inhibition of execution of the idling stop function, according to the type of the battery.

The invention provides a control system and a control method of a vehicle, for appropriately controlling permission or inhibition of execution of the idling stop function according to the type of the battery.

A control system of a vehicle according to a first aspect of the invention includes an electronic control unit. The electronic control unit is configured to (a) measure characteristics of a battery installed on the vehicle, (b) determine whether the battery is a designated battery or a non-designated battery, based on at least one of the characteristics, and (c) determine whether an idling stop function of the vehicle is permitted to be executed, based on a threshold value of at least one of the characteristics of the battery, the threshold value being set to a first threshold value when the battery is determined as the designated battery, and set to a second threshold value that is different from the first threshold value when the battery is determined as the non-designated battery.

A method of controlling a vehicle including a battery and an electronic control unit is provided according to a second aspect of the invention. The method includes (a) measuring, by the electronic control unit, characteristics of the battery installed on the vehicle, (b) determining, by the electronic control unit, whether the battery is a designated battery or a non-designated battery, based on at least one of the characteristics, and (c) determining, by the electronic control unit, whether an idling stop function of the vehicle is permitted to be executed, based on a threshold value of at least one of the characteristics of the battery. The threshold value being set to a first threshold value when the battery is determined as the designated battery, and set to a second threshold value that is different from the first threshold value when the battery is determined as the non-designated battery.

According to the first or second aspect of the invention, the vehicle control system and control method for appropriately controlling permission or inhibition of execution of the idling stop function according to the type of the battery are provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
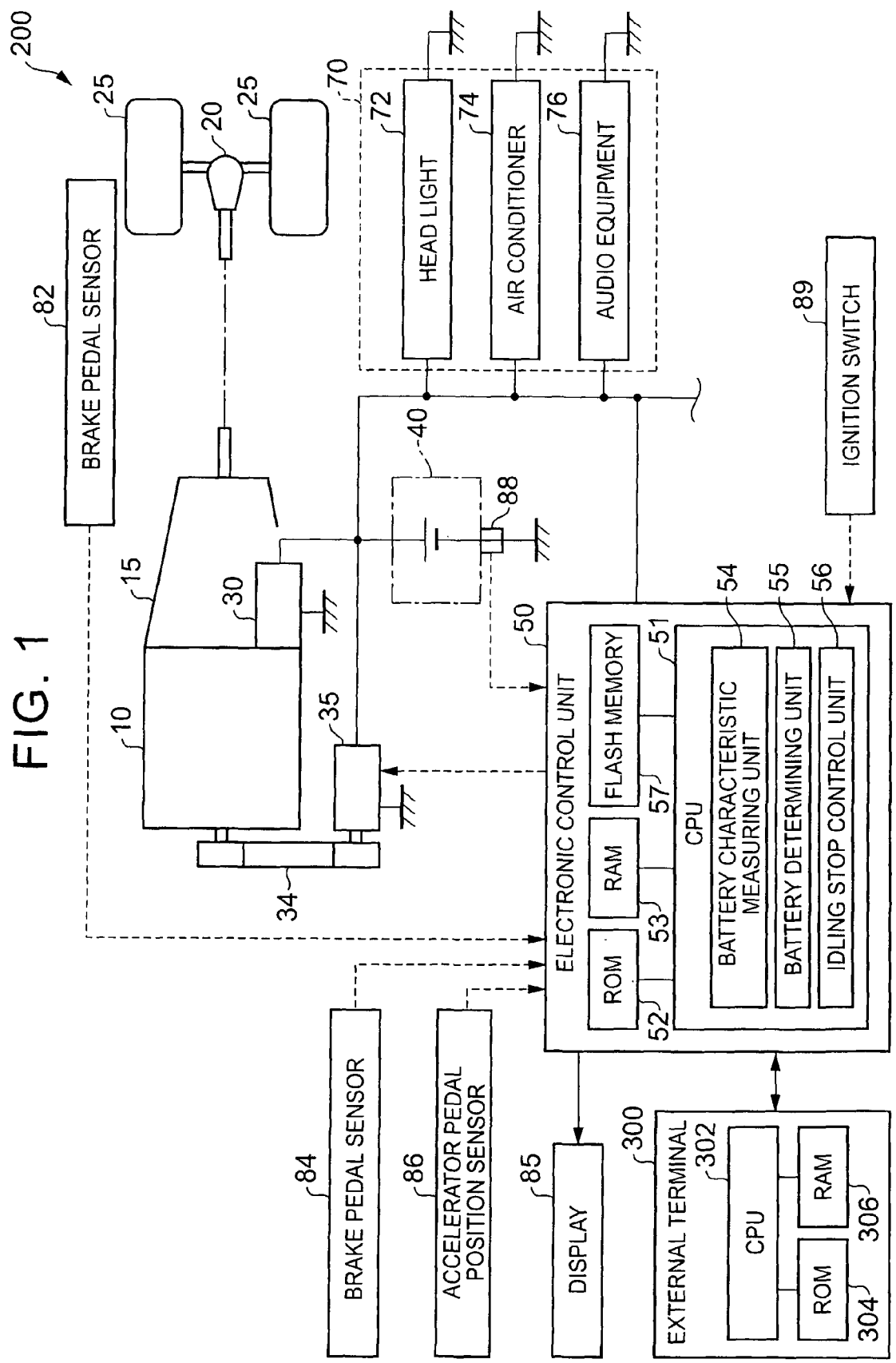
FIG. 1 is an explanatory view showing the configuration of an automobile as one embodiment of the invention.

A. Overall Configuration FIG. 1 is an explanatory view showing the configuration of an automobile 200 as one embodiment of the invention. The automobile 200 is equipped with the idling stop function. The automobile 200 includes an engine 10, automatic transmission 15, differential gear unit 20, drive wheels 25, starter 30, alternator 35, battery 40, and an electronic control unit 50. In this embodiment, the automobile 200 is equipped with a stop-and-start system having the idling stop function (automatic stop function) and automatic restart function (automatic start function) of the engine 10.

The engine 10 is an internal combustion engine that generates power by burning fuel, such as gasoline or light oil. The power of the engine 10 is transmitted to the automatic transmission 15, and is also transmitted to the alternator 35 via a drive mechanism 34. The output of the engine 10 is changed by the electronic control unit 50, according to the amount of depression of an accelerator pedal (not shown) operated by the driver.

The automatic transmission 15 automatically changes its gear ratio or speed ratio (namely, is automatically shifted up or down). The power (speed and torque) of the engine 10 is changed by the automatic transmission 15, and is transmitted at a desired speed and torque to the right and left drive wheels 25, via the differential gear unit 20. Thus, the power of the engine 10 is transmitted to the drive wheels 25 via the automatic transmission 15, while being changed according to the amount of depression of the accelerator pedal, so that the vehicle (automobile 200) is accelerated or decelerated.

In this embodiment, the drive mechanism 34 that transmits power of the engine 10 to the alternator 35 employs a belt drive arrangement. The alternator 35 generates electric power, using a part of the power of the engine 10. The electric power thus generated is used for charging the battery 40 via an inverter (not shown). In this embodiment, the alternator 35 generates electric power with voltage controlled according to a target power generation voltage signal from the electronic control unit 50.

The battery 40 is a lead storage battery as a DC power supply, and supplies electric power to peripheral devices provided besides the engine body. In this specification, a peripheral device that is provided besides the engine body and operates with electric power of the battery 40 will be called "accessory". Also, a set of accessories will be called "accessories". The automobile 200 includes head lights 72, air conditioner 74, audio equipment 76, and so forth, as the accessories 70.

The starter 30 is a cell-motor that starts the engine 10 using electric power supplied from the battery 40. When the driver operates an ignition switch 89 so as to start operation of the automobile that has been stopped, the starter 30 is activated so that the engine 10 starts. The starter 30 is also used when the engine 10 is restarted from an idling stop condition.

The electronic control unit 50 is configured as a computer having a CPU 51, ROM 52, RAM 53, flash memory 57, and an input/output port. Various sensors, starter 30, alternator 35, and the ignition switch 89 are connected to the input/output port. The sensors connected to the input/output port include, for example, a wheel speed sensor 82 that detects the rotational speed of the drive wheels 25, brake pedal sensor 84 that detects depression of the brake pedal, accelerator pedal position sensor 86 that detects the amount of depression of the accelerator pedal as the accelerator pedal position, and a battery sensor 88 that detects the voltage, current, and temperature of the battery 40.

The RAM 53 is a volatile memory, and its memory content is retained by use of electric power supplied from the battery 40. Therefore, if the battery 40 and the electronic control unit 50 are disconnected from each other, data stored in the RAM 53 (such as learned data for correcting a control map of the engine 10) is initialized. The initialization of data stored in the RAM 53 caused by removal of the battery 40 from the automobile 200 will also called "battery clearing".

The CPU 51 loads the RAM 53 with computer programs stored in the ROM 52, so as to function as a battery characteristic measuring unit 54, battery determining unit 55, and an idling stop control unit 56.

The battery characteristic measuring unit 54 measures characteristics of the battery 40, using the battery sensor 88. More specifically, the battery characteristic measuring unit 54 measures the voltage, current, temperature, internal resistance, capacity, charge receiving capability, and SOC (charging rate) of the battery 40, as characteristics of the battery 40. The internal resistance, capacity, charge receiving capability, and the SOC can be respectively calculated using the voltage, current and the temperature.

The battery determining unit 55 determines the type of the battery 40, based on the characteristics of the battery 40 measured by the battery characteristic measuring unit 54. In this embodiment, the battery determining unit 55 determines whether the battery 40 is a battery for exclusive use in an idling stop vehicle, or a general battery that is not exclusively used in the idling stop vehicle. In the following description, the former battery will be called "designated battery", and the latter battery will be called "non-designated battery". The battery determining unit 55 may display a determination result of the battery 40, on a display 85, such as a meter, or a liquid crystal display. In this embodiment, the battery for exclusive use in the idling stop vehicle as the designated battery complies with SBA S0101:2006 issued by Battery Association of Japan and relating to lead storage batteries for idling stop vehicles. Typically, the designated battery is more excellent in terms of the high-speed charging capability (charge receiving capability), capacity, and the durability, than the non-designated battery.

The idling stop control unit 56 controls the idling stop function of stopping the engine 10 when the automobile 200 is in an idling condition. The idling stop function is well known in the art, and therefore, will not be described in detail. In this embodiment, when the type of the battery 40 determined by the battery determining unit 55 is the "non-designated battery", the idling stop control unit 56 sets a more severe condition under which the idling stop function can be executed, as compared with the case where the type of the battery 40 is determined as the "designated battery". This is because the non-designated battery may not be able to supply electric power to the accessories at the time of idling stop, due to an insufficient battery capacity. If, however, the idling stop control unit 56 receives a given signal (which will be called "forced permission signal") from an external terminal 300 which will be described later, the control unit 56 does not set a severe condition as the condition under which the idling stop function can be executed, even if it is determined that the battery 40 is the "non-designated battery". This arrangement will avoid a situation where a more severe condition is applied to execution of the idling stop function, and the idling stop function fails to be executed earlier, when the battery determining unit 55 erroneously recognizes the battery installed as the non-designated battery even though the designated battery is actually installed. The condition under which the idling stop function can be executed will be described in detail later. In this embodiment, the phase that "the idling stop function can be executed" implies "the subsequent automatic restart function (automatic start function) can be executed". In a condition where the idling stop function is not performed, a situation where the engine 10 cannot be automatically started after being automatically stopped is avoided.

Figure 2:
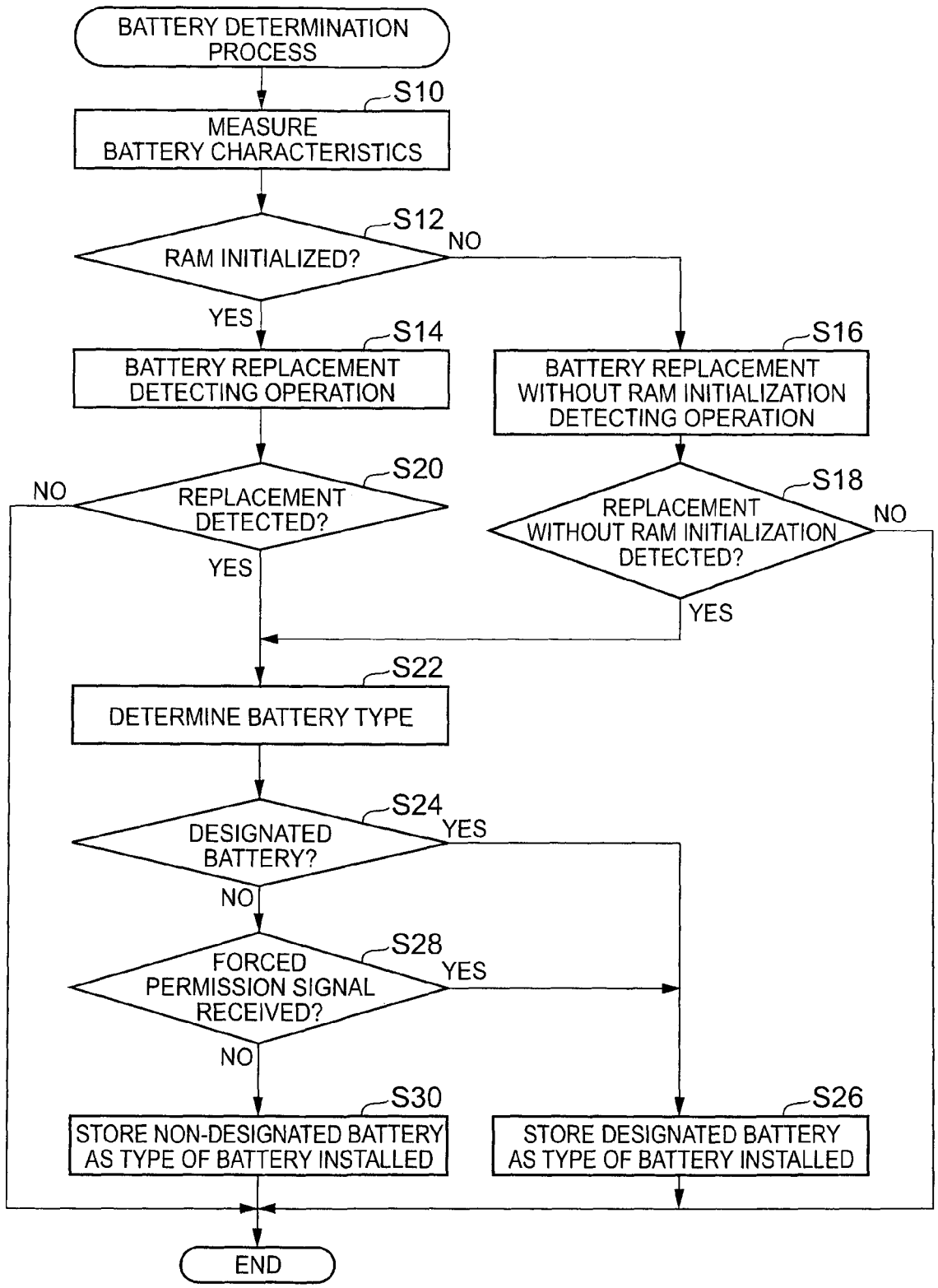
FIG. 2 is a flowchart of a battery determination process.

The external terminal 300 is an external tool, such as a service tool, or a switch, provided at a car dealer, or the like, and can be connected to the electronic control unit 50 for communication therewith. The external terminal 300 and the electronic control unit 50 may be connected by a wire, or may be wirelessly connected. The external terminal 300 is also called "DiagTester". The external terminal 300 is configured as a computer having CPU 302, ROM 304, and RAM 306. If the electronic control unit 50 and the external terminal 300 are connected to each other, the content stored in the RAM 53 of the electronic control unit 50 can be read by and displayed on the external terminal 300. Also, the external terminal 300 can give various commands to the electronic control unit 50. In this embodiment, when the user (mechanic) performs a certain operation on the external terminal 300, the external terminal 300 outputs a forced permission signal to the electronic control unit 50. If the electronic control unit 50 receives the forced permission signal from the external terminal 300, it writes information representing receipt of the forced permission signal into the RAM 53. B. Battery Determination Process: FIG. 2 is a flowchart of a battery determination process executed by the electronic control unit 50. The battery determination process is a process for determining the type of the battery 40 installed on the automobile 200. The battery determining process is executed each time the ignition switch 89 is turned on.

Once the battery determination process is executed, the battery characteristic measuring unit 54 initially measures characteristics of the battery 40, using the battery sensor 88 (step S10). In step S10, the battery characteristic measuring unit 54 measures the voltage, current, temperature, internal resistance, and capacity, as characteristics of the battery 40. The battery characteristic measuring unit 54 writes measurement results into the flash memory 57.

Subsequently, the battery determining unit 55 determines whether the RAM 53 has been initialized (namely, the content of the RAM 53 is cleared) (step S12). If it is determined that the RAM 53 has been initialized, the battery determining unit 55 further determines whether the battery 40 has been replaced, based on the characteristics of the battery 40 measured in step S10 (step S14). Even in the case where the RAM 53 has been initialized, the battery 40 may not been actually replaced. The operation of step S14 will be called "battery replacement detecting operation".

Figure 3:
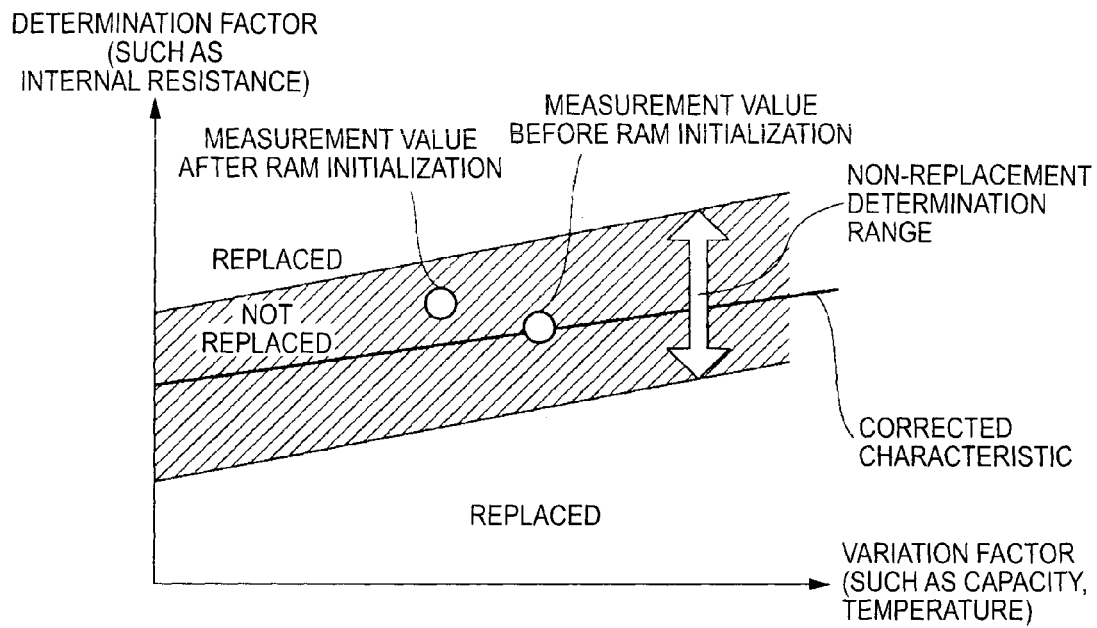
FIG. 3 is a view useful for explaining the content of a battery replacement detecting operation.

FIG. 3 is a view useful for explaining the content of the battery replacement detecting operation. In a graph shown in FIG. 3, the vertical axis indicates value of a determination factor based on which it is determined whether the battery 40 has been replaced, and the horizontal axis indicates value of a variation factor. In this embodiment, the internal resistance of the battery 40 is used as the determination factor. The variation factor that causes variations in the determination factor (internal resistance) may be the capacity or temperature of the battery 40, for example. The battery characteristic measuring unit 54 reads the internal resistance of the battery 40 stored in the flash memory 57 before the RAM 53 is initialized, and calculates a value (which will be called "corrected characteristic") obtained by correcting the read value according to the variation factor. Once the corrected characteristic is calculated, the battery characteristic measuring unit 54 determines a range (which will be called "non-replacement determination range") of the internal resistance within which it can be determined that the battery 40 has not been replaced, such that the corrected characteristic is placed at the center of the range. Then, it is determined whether the internal resistance of the battery 40 measured in the above step S10 after the RAM 53 is initialized falls within the non-replacement determination range. If the internal resistance of the battery 40 is within the non-replacement determination range, as shown in FIG. 3, the battery determining unit 55 determines that the battery 40 has not been replaced. If, on the other hand, the internal resistance measured in the current cycle is not within the non-replacement determination range, it is determined that the battery 40 has been replaced.

Figure 4:
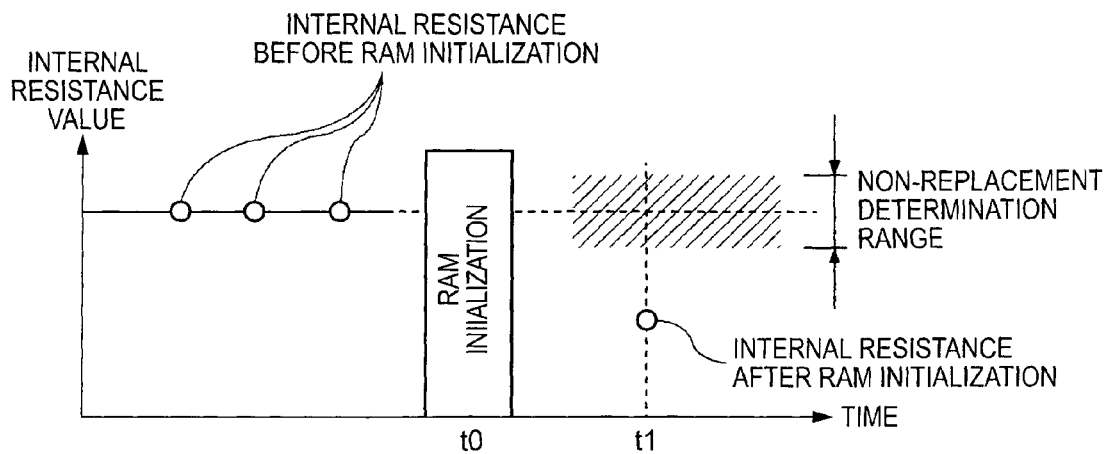
FIG. 4 is a view showing the flow of the battery replacement detecting operation.

FIG. 4 is a view showing the flow of the battery replacement detecting operation. In the above step S10, the battery characteristic measuring unit 54 calculates the internal resistance of the battery 40 and stores it in the flash memory 57 each time the ignition switch 89 is turned on. Then, if the RAM 53 is initialized at a certain time t0 (the above step S12: YES), the above step S14 is then executed at time t1, so that the non-replacement determination range is determined based on the internal resistance measured in the last cycle, and it is determined whether the battery 40 has been replaced, depending on whether the measurement value of the internal resistance obtained in this cycle falls within the non-replacement determination range. FIG. 4 shows an example in which the internal resistance of the battery 40 largely changed after the initialization of the RAM 53. In this case, the internal resistance of the battery 40 is not within the non-replacement determination range; therefore, it is determined in the above step S14 that the battery 40 has been replaced.

If it is determined in the above step S12 that the RAM 53 is not initialized, the battery determining unit 55 determines whether the battery 40 has not been replaced without initialization of the RAM 53 (step S16). Some users may replace the battery 40 with another battery while backing up the RAM 53 with a dry-cell battery, or the like, and, even if it is determined that the RAM 53 is not initialized, this does not necessarily mean that the battery has not been replaced. The operation of step S16 will be called "battery replacement without RAM initialization detecting operation".

Figure 5:
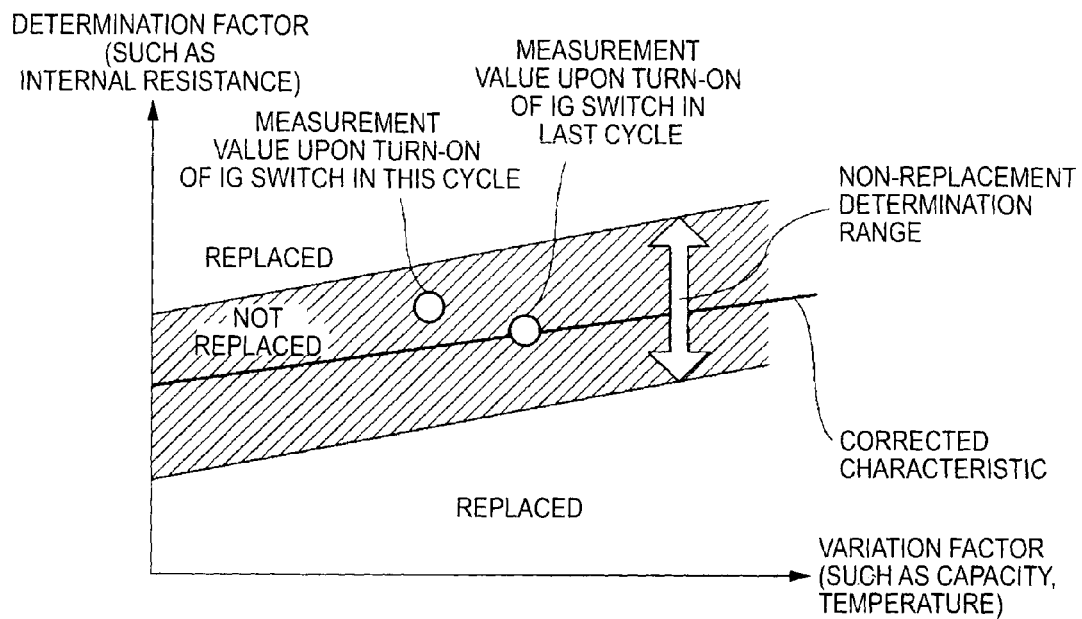
FIG. 5 is a view useful for explaining the content of a battery replacement without RAM initialization detecting operation.

FIG. 5 is a view useful for explaining the content of the battery replacement without RAM initialization detecting operation. In a graph shown in FIG. 5, the vertical axis indicates value of a determination factor based on which it is determined whether the battery 40 has been replaced, and the horizontal axis indicates value of a variation factor. In this embodiment, the internal resistance of the battery 40 is used as the determination factor. The variation factor that causes variations in the determination factor (internal resistance) may be the capacity or temperature of the battery 40, for example. The battery characteristic measuring unit 54 reads the internal resistance of the battery 40 stored in the flash memory 57 when the ignition switch is turned on in the last cycle, and calculates a value (which will be called "corrected characteristic") obtained by correcting the read value according to the variation factor. Once the corrected characteristic is calculated, the battery characteristic measuring unit 54 determines a range (which will be called "non-replacement determination range") of the internal resistance within which it can be determined that the battery 40 has not been replaced, such that the corrected characteristic is placed at the center of the range. Then, when the ignition switch is turned on in this cycle, it is determined whether the internal resistance of the battery 40 measured in the above step S10 falls within the non-replacement determination range. If the internal resistance of the battery 40 is within the non-replacement determination range, as shown in FIG. 5, the battery determining unit 55 determines that the battery 40 has not been replaced. If, on the other hand, the internal resistance measured in this cycle is not within the non-replacement determination range, it is determined that the battery 40 has been replaced.

Figure 6:
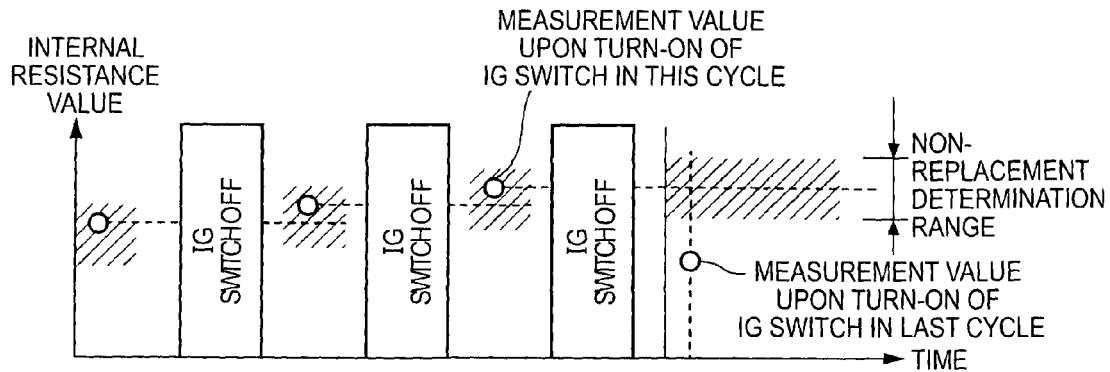
FIG. 6 is a view showing the flow of the battery replacement without RAM initialization detecting operation.

FIG. 6 is a view showing the flow of the battery replacement without RAM initialization detecting operation. In the above step S10, the battery characteristic measuring unit 54 calculates the internal resistance of the battery 40 and stores it in the flash memory 57 each time the ignition switch 89 is turned on. Then, if the ignition switch 89 is turned on, and it is determined in the above step S12 that the RAM 53 is not initialized (the above step. S12: NO), the above step S16 is then executed, so that the non-replacement determination range is determined based on the internal resistance measured in the last cycle, and it is determined whether the battery 40 has been replaced, depending on whether the measurement value of the internal resistance obtained in this cycle falls within the non-replacement determination range. FIG. 6 shows an example in which the internal resistance of the battery 40 largely changed upon turn-on of the ignition switch in this cycle. In this case, the internal resistance of the battery 40 is not within the non-replacement determination range; therefore, it is determined in the above step S16 that the battery 40 has been replaced.

If it is determined in the battery replacement detecting operation of step S14 that the battery 40 has been replaced (step S20: YES), the battery determining unit 55 determines the type of the battery 40, based on the characteristics of the battery 40 (step S22). Also, when it is determined in the battery replacement without RAM initialization detecting operation of step S16 that the battery 40 has been replaced (step S18: YES), the battery determining unit 55 determines the type of the battery 40, based on the characteristics of the battery 40 (step S22).

Figure 7:
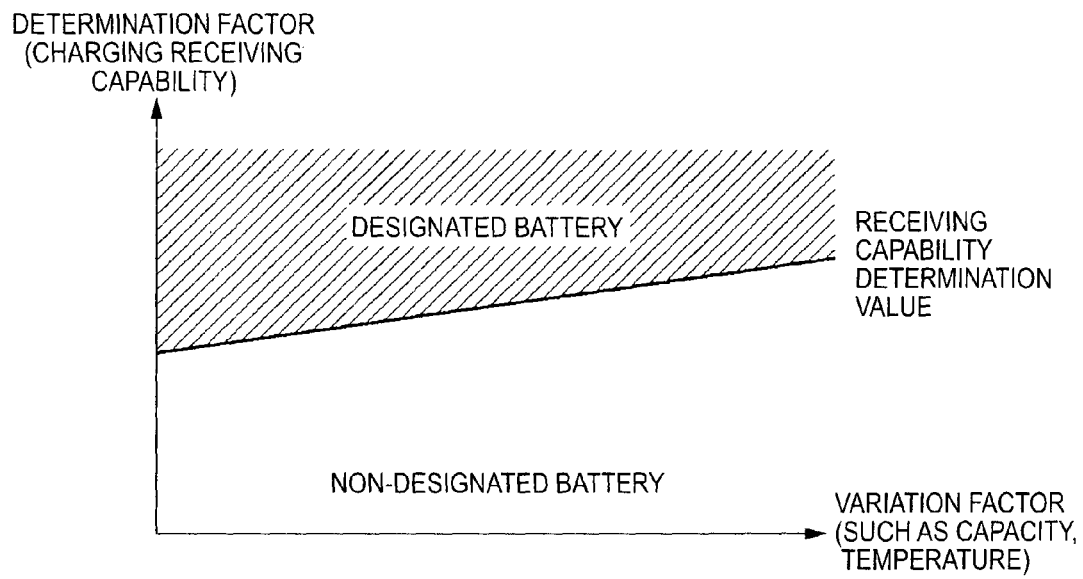
FIG. 7 is a view useful for explaining a method of determining the type of the battery.

FIG. 7 is a view useful for explaining a method of determining the type of the battery 40. In a graph of FIG. 7, the vertical axis indicates value of a determination factor based on which the type of the battery 40 is determined, and the horizontal axis indicates a variation factor. In this embodiment, the charge receiving capability (charge recovery capability) of the battery 40 is used. The variation factor may be the capacity or temperature of the battery 40. In the above step S22, the battery characteristic measuring unit 54 measures the charge receiving capability of the battery 40, and the battery determining unit 55 compares the measured charge receiving capability of the battery 40, with a receiving capability determination value set in advance according to the variation factor, and determines that the type of the battery 40 is the designated battery if the charge receiving capability is larger than the receiving capability determination value. If, on the other hand, the charge receiving capability is smaller than the receiving capability determination value, it is determined that the type of the battery 40 is the non-designated battery.

Figure 8:
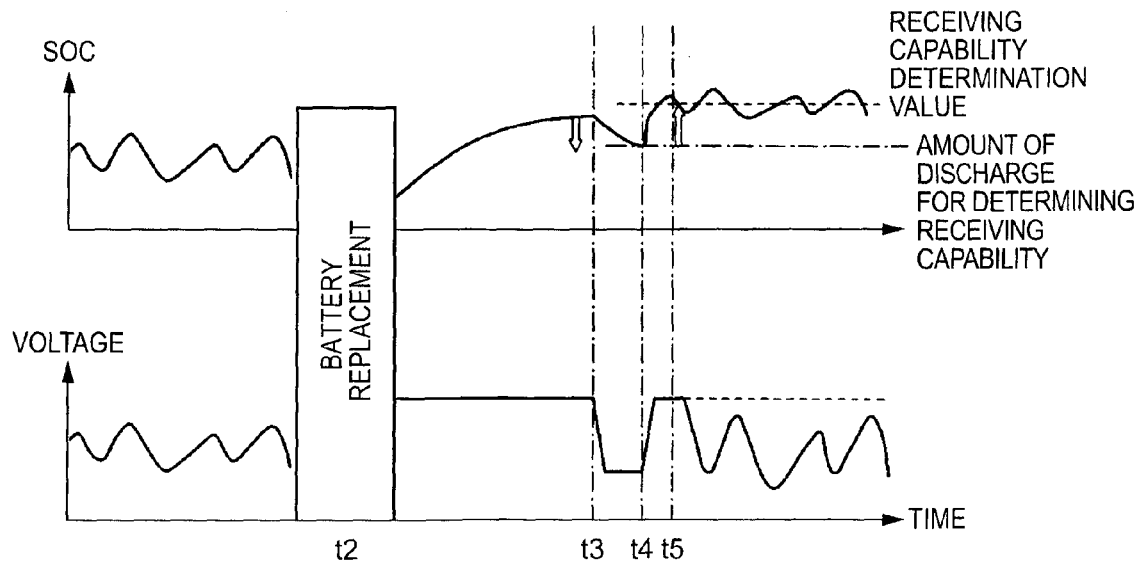
FIG. 8 is a view showing the flow of determination of the type of the battery.

FIG. 8 is a view showing the flow of determination of the type of the battery. The upper graph shows changes in the SOC of the battery 40, and the lower graph shows changes in the voltage of the battery 40. If replacement of the battery 40 is detected in the above step S14 or step S16, the battery characteristic measuring unit 54 initially applies a given voltage to the battery 40 so as to fully charge the battery 40, and discharges the battery 40 by a given discharge amount ("discharge amount for determining the receiving capability" in FIG. 8), at time t3 after the battery 40 is fully charged, so as to reduce variations in the SOC of the battery 40. After the variations in the SOC are reduced in this manner, the battery characteristic measuring unit 54 charges the battery 40 again at time t4, and measures the SOC at time t5 after a predetermined period of time. The thus measured amount of change of the SOC from time t4 to time t5, or the integrated amount of charge current from time t4 to time t5, represents the charge receiving capability. If the charge receiving capability thus measured is larger than the receiving capability determination value (FIG. 7) that varies with the variation factor, the battery determining unit 55 determines that the type of the battery 40 is the designated battery. If, on the other hand, the charge receiving capability is smaller than the receiving capability determination value, the battery determining unit 55 determines that the type of the battery 40 is the non-designated battery.

If it is determined in the above step S22 that the type of the battery 40 is the designated battery (step S24: YES), the idling stop control unit 56 stores the determination result that the battery 40 is the designated battery, in the flash memory 57 (step S26). If, on the other hand, it is determined in the above step S22 that the type of the battery 40 is the non-designated battery (step S24: NO), the idling stop control unit 56 determines whether it has received the forced permission signal from the external terminal 300 (step S28). The idling stop control unit 56 can determine whether the forced permission signal is received from the external terminal 300, by determining whether any information indicating receipt of the forced permission signal has been written in the RAM 53.

Figure 9:
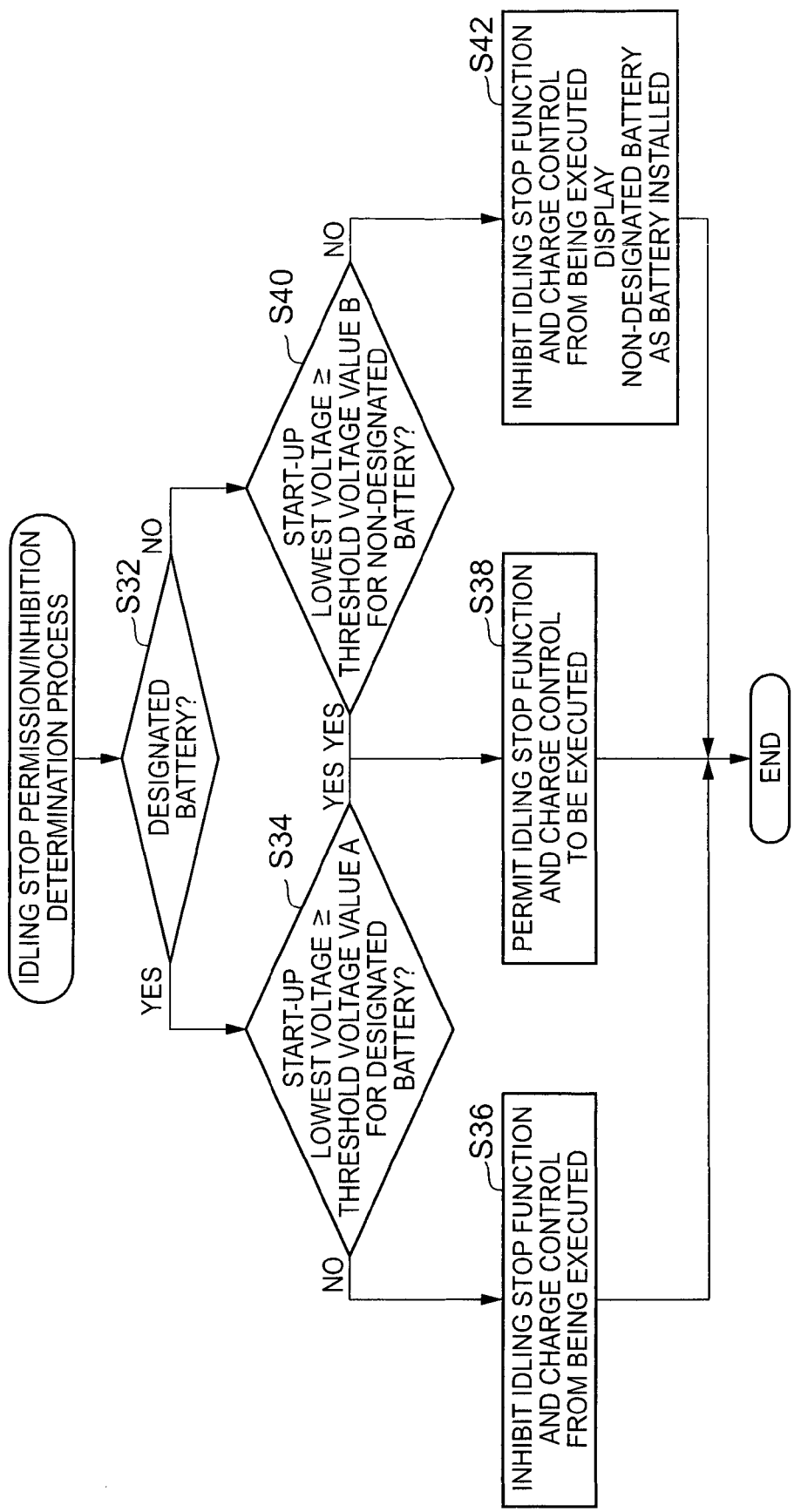
FIG. 9 is a flowchart of an idling stop permission/inhibition determination process.

If the forced permission signal is received from the external terminal 300 (step S28: YES), the idling stop control unit 56 stores the result of determination that the type of the battery 40 is the designated battery, in the flash memory 57, even if the type of the battery 40 determined in step S22 is the non-designated battery (step S26). If, on the other hand, no forced permission signal is received from the external terminal 300 (step S28: NO), the idling stop control unit 56 stores the result of determination that the type of the battery 40 is the non-designated battery, in the flash memory 57 (step S30). If no replacement of the battery 40 is detected in the battery replacement detecting operation of the above step S14 (step S20: NO), the electronic control unit 50 finishes the battery determination process. Also, if no replacement of the battery 40 is detected in the battery replacement without RAM initialization detecting operation of the above step S16 (step S18: NO), the electronic control unit 50 finishes the battery determination process. In this case, step S22 and subsequent steps are not executed, and the result of determination stored in the flash memory 57 is not updated. Accordingly, the result of determination made in the last cycle is retained as it is in the flash memory 57. C. Idling Stop Permission/Inhibition Process FIG. 9 is a flowchart of an idling stop permission/inhibition process performed by the electronic control unit 50. The idling stop permission/inhibition process is a process for determining whether the idling stop function can be executed, according to the result of determination made by the battery determining unit 55 in the battery determination process. The idling stop permission/inhibition process is executed each time the engine 10 is started. In this embodiment, starting of the engine 10 includes starting when the ignition switch 89 is turned on, and starting caused by the automatic start function (automatic restart function).

Once the idling stop permission/inhibition process is executed, the idling stop control unit 56 initially reads the result of determination stored in the flash memory 57.

If the result of determination is "designated battery" (step S32: YES), the idling stop control unit 56 compares the start-up lowest voltage of the battery 40 with a threshold voltage value A [V] for the designated battery (step S34).

Figure 10:
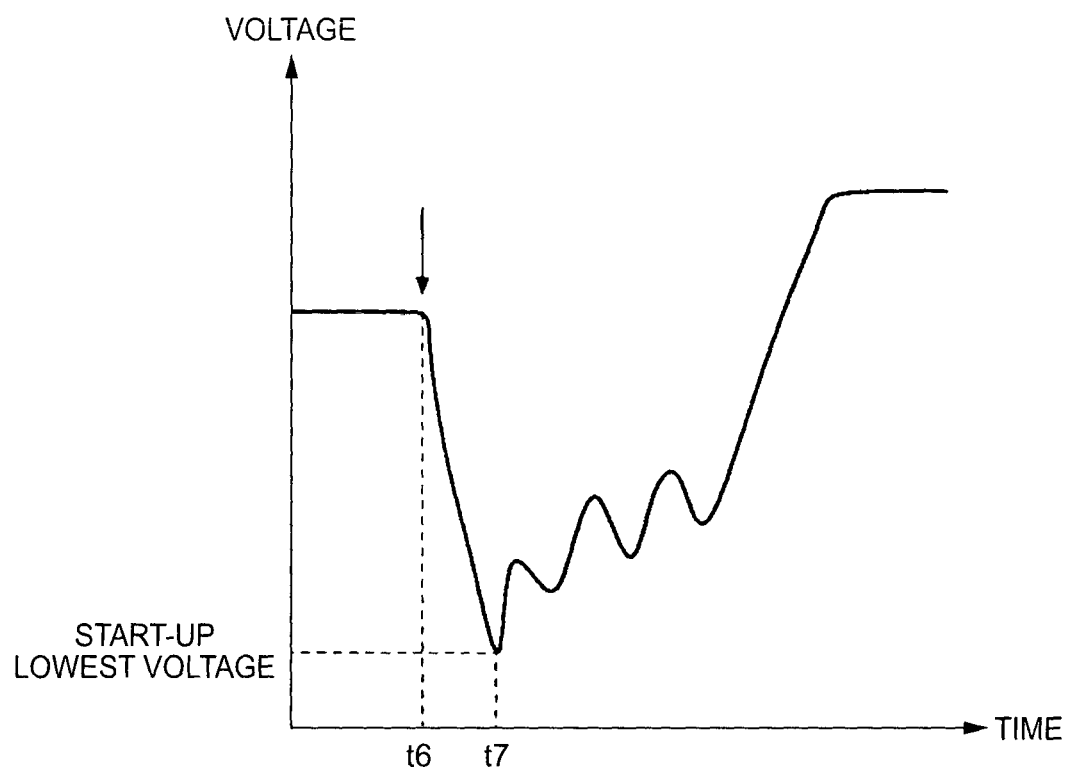
FIG. 10 is a view useful for explaining a start-up lowest voltage.

FIG. 10 is a view useful for explaining the start-up lowest voltage of the battery 40. In a graph shown in FIG. 10, the vertical axis indicates the voltage of the battery 40, and the horizontal axis indicates time. At time t6, the starter 30 is started so as to start the engine 10, and cranking is started. At this time, the battery 40 supplies electric power required for starting rotation of the starter 30, to the starter 30. Therefore, the voltage of the battery 40 keeps lowering until time t7 is reached. Then, the rotational speed of the stator 30 increases while varying until the engine 10 is started. As the rotational speed of the stator 30 increases while varying, electric power supplied to the stator 30 decreases while varying, and the voltage of the battery 40 increases while varying. Thus, the voltage of the battery 40 typically increases while varying after it reaches the minimum value at time t7. The start-up lowest voltage of the battery 40 is defined as the lowest voltage value detected during a series of variations of the voltage when the engine is started. In the example of FIG. 10, the start-up lowest voltage corresponds to the voltage value detected by the battery sensor 88 at time t7.

When it is determined in the above step S34 that the start-up lowest voltage of the battery 40 is equal to or higher than the threshold voltage value A [V] for the designated battery (step S34: YES), the idling stop control unit 56 permits the idling stop function to be executed, and permits charge control to be performed (step S38). For example, when a given engine stop condition, such as a condition that the vehicle speed becomes less than a given speed, is satisfied, the idling stop control unit 56 outputs a stop signal to the engine 10, and stops the engine 10. If, on the other hand, it is determined in the above step S34 that the start-up lowest voltage of the battery 40 is lower than the threshold voltage value A [V] for the designated battery (step S34: NO), the idling stop control unit 56 inhibits the idling stop function and the charge control from being executed (step S36). For example, even when the given engine stop condition is satisfied, the idling stop control unit 56 does not output a stop signal to the engine 10. In this embodiment, the charge control means control for stopping power generation by the alternator 35 when the amount of charge of the battery 40 becomes equal to a predetermined upper-limit level, and starting power generation by the alternator 35 when the amount of charge of the battery 40 becomes equal to a predetermined lower-limit level. "To inhibit the charge control from being executed" means keeping electric power generated by the alternator 35 so as to keep the battery 40 in a fully charged condition even when the battery 40 is fully charged.

On the other hand, if the result of determination is "non-designated battery" in the above step S32 (step S32: NO), the idling stop control unit 56 compares the start-up lowest voltage of the battery 40 with a threshold voltage value B [V] for the non-designated battery (step S40). In this embodiment, the threshold voltage value B [V] for the non-designated battery is higher than the threshold voltage value A [V] for the designated battery.

If it is determined in the above step S40 that the start-up lowest voltage of the battery 40 is equal to or higher than the threshold voltage value B [V] for the non-designated battery (step S40: YES), the idling stop control unit 56 permits the idling stop function to be executed, and permits the charge control to be performed (step S38). If, on the other hand, it is determined in the above step S40 that the start-up lowest voltage of the battery 40 is lower than the threshold voltage value B [V] for the non-designated battery (step S40: NO), the idling stop control unit 56 inhibits the idling stop function from being executed, inhibits the charge control from being executed, and causes the display 85 to display information that the non-designated battery is installed (step S42). If the idling stop permission/inhibition process as explained above is finished, the electronic control unit 50 performs operation control of the automobile 200, depending on the permission or inhibition of execution of the idling stop function, which is determined according to the idling stop permission/inhibition process.

In the above-described embodiment, when the result of determination is "non-designated battery", and the start-up lowest voltage of the battery 40 is lower than the threshold voltage value B [V] for the non-designated battery, the idling stop control unit 56 causes the display 85 to display the information that the non-designated battery is installed. However, if the result of determination is "non-designated battery", the idling stop control unit 56 may cause the display 85 to display the information that the non-designated battery is installed even when it is determined that the start-up lowest voltage of the battery 40 is equal to or higher than the threshold voltage value B [V] for the non-designated battery. This arrangement is made so as to inform the driver that the idling stop function is highly likely to cease to be executed at an earlier point in time than that in the case where the designated battery is installed.

Figure 11:
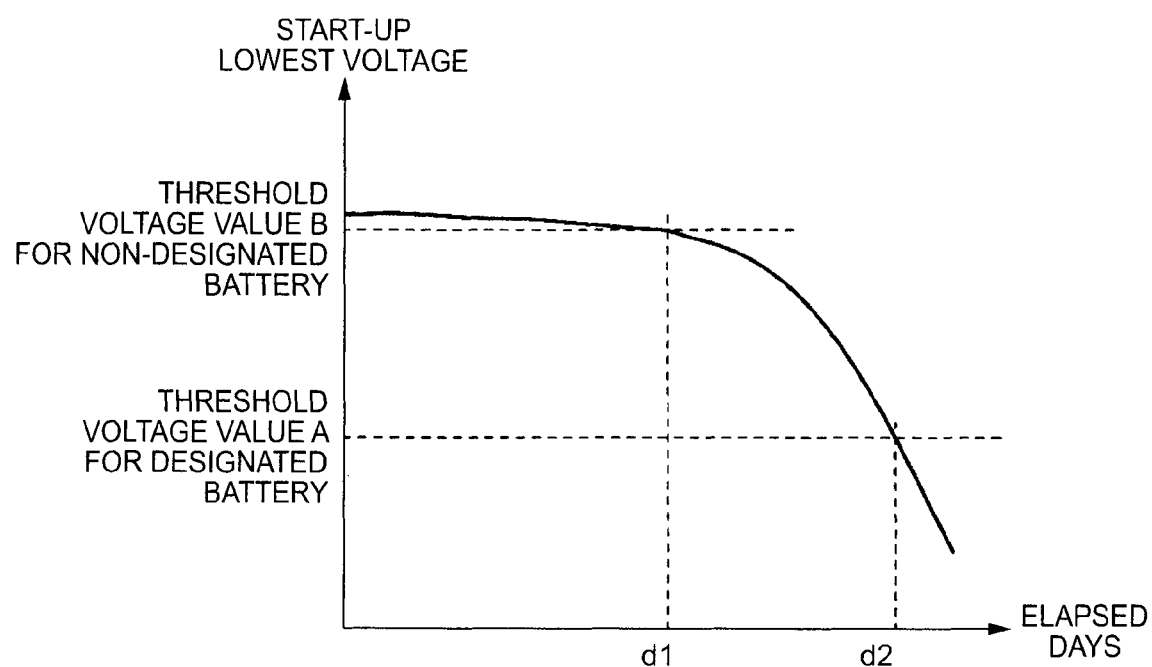
FIG. 11 is a view showing one example of the relationship between the start-up lowest voltage of the battery and the number of days elapsed until the idling stop function ceases to be executed.

Referring next to FIG. 11 through FIG. 14, an effect provided by setting the threshold voltage value A [V] for the designated battery and the threshold voltage value B [V] for the non-designated battery to different values will be explained. FIG. 11 is a view indicating the relationship between the start-up lowest voltage of the battery 40, and the number of days elapsed until the idling stop function ceases to be executed. In a graph shown in FIG. 11, the vertical axis indicates the start-up lowest voltage of the battery 40, and the horizontal axis indicates the number of days elapsed from the start of use of the battery 40.

If the result of determination stored in the flash memory 57 is "non-designated battery", the idling stop control unit 56 inhibits the idling stop function from being executed when the start-up lowest voltage of the battery 40 becomes lower than the threshold voltage value B [V] for the non-designated battery upon a lapse of days d1. If, on the other hand, the result of determination is "designated battery", the idling stop control unit 56 continues to permit the idling stop function to be executed even when the start-up lowest voltage of the battery 40 becomes lower than the threshold voltage value B [V] for the non-designated battery after the lapse of days d1, since the start-up lowest voltage is still higher than the threshold voltage value A [V] for the designated battery. If the result of determination is "designated battery", the idling stop control unit 56 permits the idling stop function to be executed until the start-up lowest voltage becomes lower than the threshold voltage value A [V] for the designated battery. If the start-up lowest voltage becomes lower than the threshold voltage value A [V] for the designated battery upon a lapse of days d2, the idling stop control unit 56 inhibits the idling stop function from being executed. Thus, even if the start-up lowest voltage changes with time in the same manner, the number of days elapsed until the idling stop function ceases to be executed is reduced by (d2−d1) in the case where the result of determination is "non-designated battery", as compared with the case where the result of determination is "designated battery". In the example of FIG. 11, the threshold voltage value A [V] for the designated battery and the threshold voltage value B [V] for the non-designated battery are both registered in advance in the ROM 52 or the flash memory 57.

Figure 12:
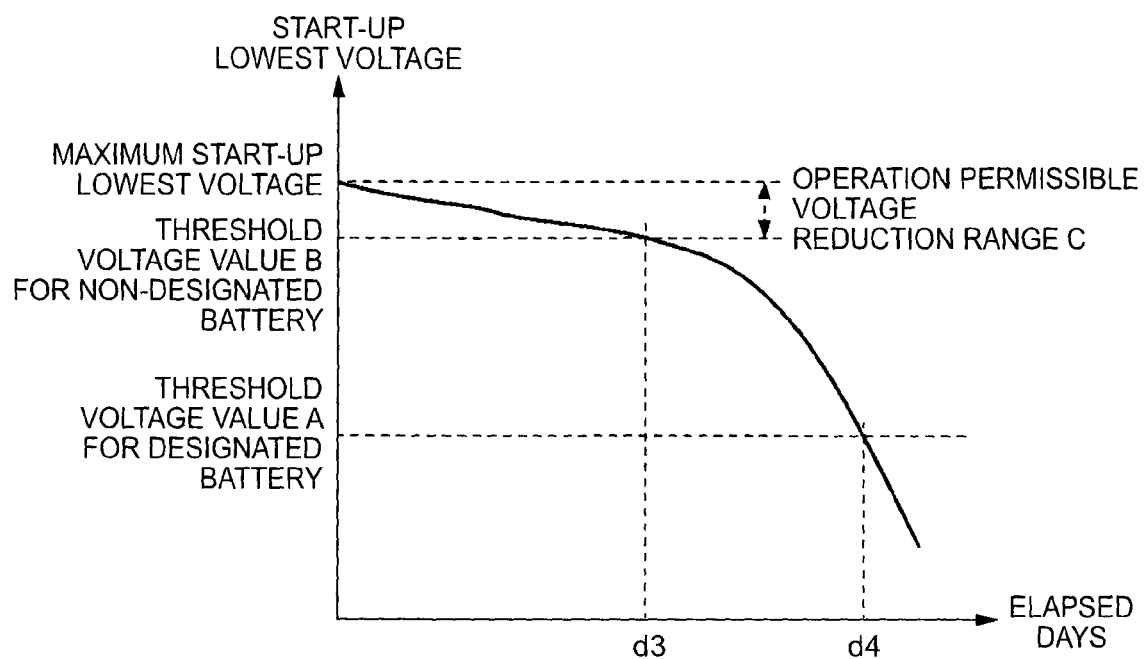
FIG. 12 is a view showing another example of the relationship between the start-up lowest voltage of the battery and the number of days elapsed until the idling stop function ceases to be executed.

Like FIG. 11, FIG. 12 is a view indicating the relationship between the start-up lowest voltage of the battery 30 and the number of days elapsed until the idling stop function ceases to be executed. FIG. 12 is different from FIG. 11 in that the threshold voltage value B [V] for the non-designated battery varies according to the characteristics of the battery 40. More specifically, the threshold voltage value B [V] for the non-designated battery is set to a value obtained by subtracting an operation permissible voltage reduction range C [V] from the maximum start-up lowest voltage. The maximum start-up lowest voltage is the maximum value of the start-up lowest voltage. The start-up lowest voltage measured immediately after battery replacement may be used in place of the maximum start-up lowest voltage. In this case, the threshold voltage value B [V] for the non-designated battery is set to a value obtained by subtracting the operation permissible voltage reduction range C [V] from the start-up lowest voltage measured immediately after battery replacement. The operation permissible voltage reduction range C [V] is a voltage value registered in advance in the ROM 52 or the flash memory 57, and may be 1 [V], for example. The effect provided by setting the threshold voltage value A [V] for the designated battery and the threshold voltage value B [V] for the non-designated battery to different values is similar to the content as described above referring to FIG. 11, and therefore, will not be explained.

Thus, with the arrangement of FIG. 12, the threshold voltage value B [V] for the non-designated battery is calculated according to the characteristics of the battery 40. More specifically, the threshold voltage value B [V] for the non-designated battery is not an absolute value registered in advance in the ROM 52 or the flash memory 57, irrespective of the start-up lowest voltage measured immediately after battery replacement and the maximum start-up lowest voltage, as in the arrangement of FIG. 11, but is calculated as a value relative to the start-up lowest voltage measured immediately after battery replacement or the maximum start-up lowest voltage. Therefore, even when the maximum start-up lowest voltage of the battery 40 as the non-designated battery is relatively high, for example, the electronic control unit 50 can prevent the idling stop function from being permitted to be executed for an excessively large number of days.

The electronic control unit 50 may set a value obtained by multiplying the maximum start-up lowest voltage or the start-up lowest voltage measured immediately after battery replacement by a predetermined percentage (e.g., 95%), as the threshold voltage value B [V] for the non-designated battery.

Figure 13:
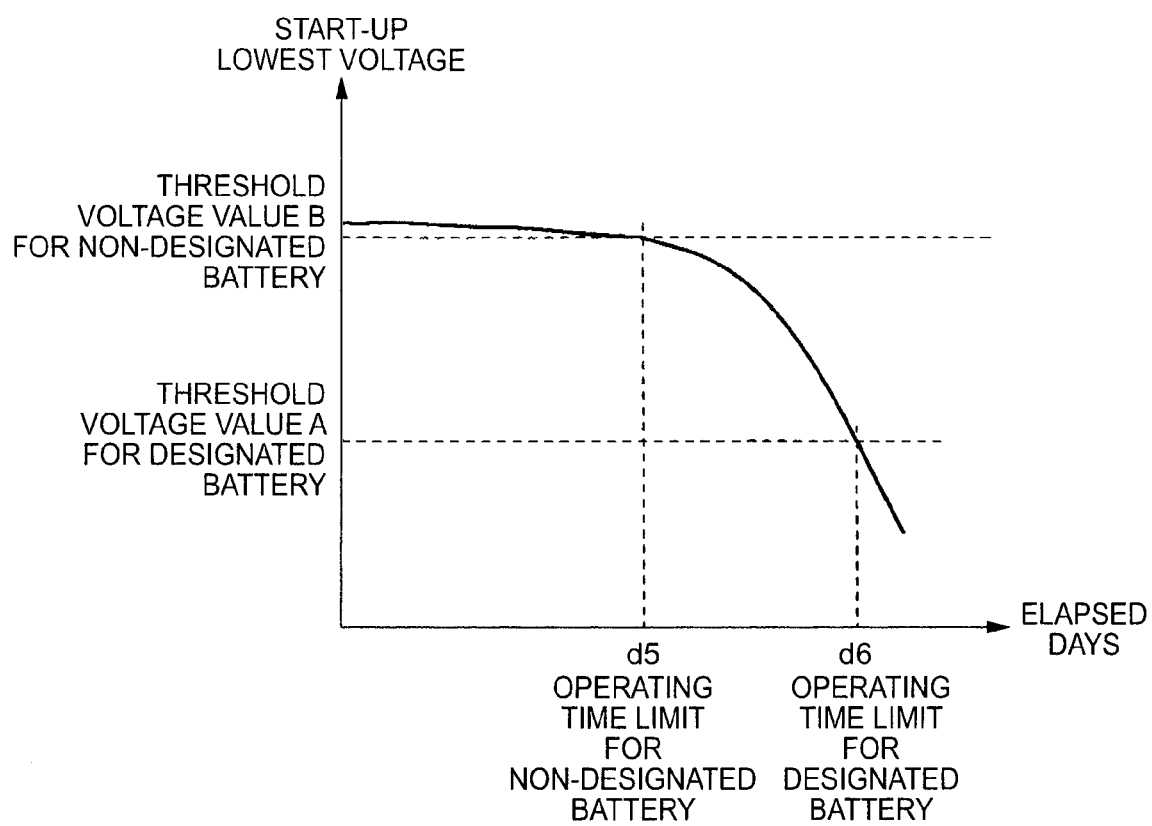
FIG. 13 is a view showing a further example of the relationship between the start-up lowest voltage of the battery and the number of days elapsed until the idling stop function ceases to be executed.

Like FIG. 11 and FIG. 12, FIG. 13 is a view indicating the relationship between the start-up lowest voltage of the battery 40, and the number of days elapsed until the idling stop function ceases to be executed. FIG. 13 is different from FIG. 11 and FIG. 12 in that the operating time limit (number of days) for the non-designated battery, in place of the threshold voltage value B [V] for the non-designated battery, is employed as the threshold value. More specifically, the operating time limit (number of days) for the non-designated battery is set as the number of days elapsed at the time when the start-up lowest voltage of the battery 40 is estimated to become lower than the threshold voltage value B [V] for the non-designated battery. In this embodiment, the operating time limit (number of days) for the non-designated battery is registered in advance in the ROM 52 or the flash memory 57.

If the result of determination stored in the flash memory 57 is "non-designated battery", the idling stop control unit 56 inhibits the idling stop function from being executed when the number of days elapsed reaches d5 as the operating time limit for the non-designated battery. If, on the other hand, the result of determination is "designated battery", the start-up lowest voltage of the battery 40 is still estimated to be equal to or higher than the threshold voltage A [V] for the designated battery even if the number of days elapsed reaches d5; therefore, the idling stop control unit 56 continues to permit the idling stop function to be executed. This is because, when the result of determination is "designated battery", the idling stop control unit 56 permits the idling stop function to be executed until the start-up lowest voltage becomes lower than the threshold voltage value A [V] for the designated battery. Then, if the start-up lowest voltage becomes lower than the threshold voltage value A [V] for the designated battery upon a lapse of days d6, the idling stop control unit 56 inhibits the idling stop function from being executed.

When the result of determination is "designated battery", too, the idling stop control unit 56 may employ the operating time limit (number of days) for the designated battery, in place of the threshold voltage value A [V] for the designated battery, as the threshold value, as in the case where the result of determination is "non-designated battery". In this case, the operating time limit (number of days) for the designated battery is set to the number of days elapsed at the time when the start-up lowest voltage of the battery 40 as the designated battery is estimated to become lower than the threshold voltage value A [V] for the designated battery. The operating time limit (number of days) for the designated battery is registered in advance in the ROM 52 or the flash memory 57. When the result of determination is "designated battery", the idling stop control unit 56 inhibits the idling stop function from being executed when the number of days elapsed reaches d6 as the operating time limit for the designated battery.

Thus, the electronic control unit 50 estimates the start-up lowest voltage of the battery 40 based on the number of days elapsed from the start of use of the battery 40, and determines permission or inhibition of execution of the idling stop function. Therefore, the electronic control unit 50 is able to inhibit the idling stop function from being executed at the time when the start-up lowest voltage of the battery 40 as the non-designated battery is estimated to become lower than the threshold voltage value B [V] for the non-designated battery, without monitoring the start-up lowest voltage of the battery 40, or without relying solely on the result of monitoring thereof.

Also, the electronic control unit 50 may employ a threshold value based on the number of times or frequency of execution of the automatic start function after the start of use of the battery 40, the running distance of the automobile 200 after the start of use of the battery 40, or the like, in place of the operating time limit (number of days) for the non-designated battery as the threshold value based on the number of days elapsed from the start of use of the battery 40.

Figure 14:
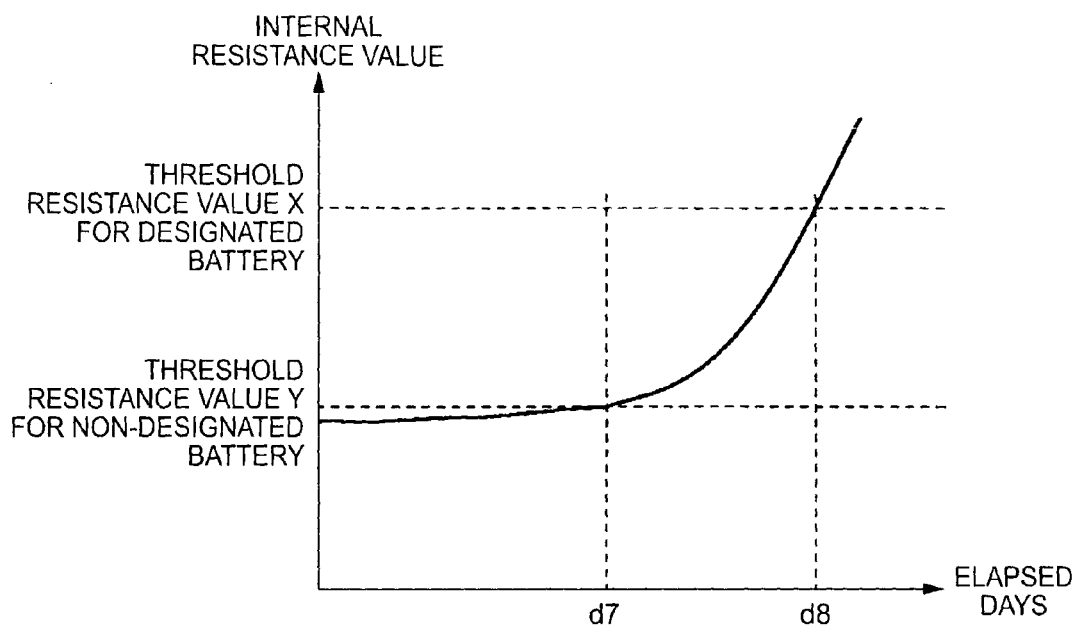
FIG. 14 is a view showing one example of the relationship between the internal resistance of the battery and the number of days elapsed until the idling stop function ceases to be executed.

FIG. 14 is a view indicating the relationship between the internal resistance of the battery 40, and the number of days elapsed until the idling stop function ceases to be executed. FIG. 14 is different from FIG. 11 and FIG. 12 in that a threshold resistance value X [Ω] for the designated battery, and a threshold resistance value Y [Ω] for the non-designated battery are employed as threshold values, in place of the threshold voltage value A [V] for the designated battery, and the threshold voltage value B [V] for the non-designated battery. More specifically, the threshold resistance value X [Ω] for the designated battery is set as the internal resistance of the battery 40 at the time when the start-up lowest voltage of the battery 40 as the designated battery is estimated to become lower than the threshold voltage value A [V] for the designated battery. Also, the threshold resistance value Y [Ω] for the non-designated battery is set as the internal resistance of the battery 40 at the time when the start-up lowest voltage of the battery 40 as the non-designated battery is estimated to become lower than the threshold voltage value B [V] for the non-designated battery. In this embodiment, the threshold resistance value X [Ω] for the designated battery and the threshold resistance value Y [Ω] for the non-designated battery are registered in advance in the ROM 52 or the flash memory 57.

If the result of determination stored in the flash memory 57 is "non-designated battery", the idling stop control unit 56 inhibits the idling stop function from being executed when the internal resistance of the battery 40 exceeds the threshold resistance value Y for the non-designated battery upon a lapse of days d7. This is because the start-up lowest voltage of the battery 40 as the non-designated battery is estimated to become lower than the threshold voltage value B [V] for the non-designated battery. If the result of determination is "designated battery", on the other hand, the idling stop control unit 56 continues to permit the idling stop function to be executed even if the internal resistance exceeds the threshold resistance value Y [Ω] for the non-designated battery upon the lapse of days d7, since the internal resistance is still lower than the threshold resistance value X [Ω] for the designated battery. This is because, when the result of determination is "designated battery", the idling stop control unit 56 permits the idling stop function to be executed until the start-up lowest voltage is estimated to become lower than the threshold voltage value A [V] for the designated battery. Then, if the internal resistance exceeds the threshold resistance value X [Ω] for the designated battery upon a lapse of days d8, the idling stop control unit 56 inhibits the idling stop function from being executed. This is because the start-up lowest voltage of the battery 40 as the designated battery is estimated to become lower than the threshold voltage value A [V] for the designated battery. Thus, even if the internal resistance value varies with time in the same manner, the number of days elapsed until the idling stop function ceases to be executed is reduced by (d8−d7) in the case where the result of determination is "non-designated battery", as compared with the case where the result of determination is "designated battery".

As described above, the electronic control unit 50 directly or indirectly determines whether the start-up lowest voltage of the battery 40 determined as the designated battery becomes lower than the threshold voltage value A [V] for the designated battery. Also, the electronic control unit 50 directly or indirectly determines whether the start-up lowest voltage of the battery 40 determined as the non-designated battery becomes lower than the threshold voltage value B [V] for the non-designated battery, which is different from the threshold voltage value A [V] for the designated battery. Then, the electronic control unit 50 determines whether the idling stop function is permitted to be executed or inhibited from being executed, based on the result of the determination. Therefore, even when the non-designated battery is installed, the electronic control unit 50 can permit the idling stop function to be executed, without uniformly inhibiting execution of the idling stop function, when a condition different from that used when the designated battery is installed is satisfied. More specifically, the electronic control unit 50 can permit the idling stop function to be executed, when a more severe condition in terms of performance than that used when the designated battery is installed is satisfied, for example. As a result, the electronic control unit 50 can permit the idling stop function to be executed even in the case of emergency use of a non-designated battery caused by run-out of the battery in a remote area, so that advantages, such as low fuel consumption, provided by the idling stop function are prevented from being impaired.

Also, even in the case where the electronic control unit 50 permits the idling stop function to be executed in the condition where the non-designated battery is installed, the electronic control unit 50 inhibits the idling stop function from being executed when the start-up lowest voltage becomes lower than the threshold voltage value B [V] for the non-designated battery. Therefore, the electronic control unit 50 can permit the idling stop function to be executed within a range of the SOC or frequency within which there is no problem in terms of the lifetime of the battery 40. Also, the electronic control unit 50 can be prevented from permitting the idling stop function to be executed until the life of the battery 40 comes to an end, and thus making the life of the battery 40 extremely short. At the time when the idling stop function ceases to be executed, the battery 40 as the non-designated battery is not degraded to such an extent that its replacement is required. Therefore, the battery 40 can be continuously used for supplying electric power to various electrical loads, even after the idling stop function ceases to be performed.

Also, the electronic control unit 50 directly determines whether the start-up lowest voltage of the battery 40 becomes lower than the threshold voltage value, by monitoring the voltage of the battery 40 which is influenced by differences in the manner of driving the automobile. Therefore, the electronic control unit 50 can determine the time at which the idling stop function is inhibited from being executed, while more accurately reflecting the influence due to the differences in the manner of driving on the determination, as compared with the case where the determination is indirectly made.

Also, the electronic control unit 50 may indirectly determine whether the start-up lowest voltage of the battery 40 becomes lower than the threshold voltage value, by monitoring the period of use of the battery 40, the frequency (number of times) of execution of the automatic start function, running distance, or the internal resistance of the battery 40. Therefore, the electronic control unit 50 can appropriately determine the time at which the idling stop function is inhibited from being executed, based on the result of indirect determination, even when the voltage of the battery 40 is not monitored.

Also, the electronic control unit 50 may determine whether the start-up lowest voltage of the battery 40 becomes lower than the threshold voltage value, by monitoring at least one of the period of use of the battery 40, the frequency (number of times) of execution of the automatic start function, running distance, and the internal resistance of the battery 40, in addition to the voltage of the battery 40. With this arrangement, the electronic control unit 50 can enhance the reliability of the result of determination.

The electronic control unit 50 may determine whether the idling stop function is permitted to be executed or inhibited from being executed, based on at least one of the period of use of the battery 40, the frequency (number of times) of execution of the automatic start function, running distance, and the internal resistance of the battery 40, irrespective of the start-up lowest voltage of the battery 40.

According to the automobile 200 of this embodiment as explained above, even if the type of the battery 40 determined is the non-designated battery, the determination result is corrected to be "designated battery" if the forced permission signal is received from the external terminal 300. Therefore, even when the type of the battery is erroneously determined as the non-designated battery, due to chronological changes, or the like, even though the designated battery is actually installed, it is possible to avoid early inhibition of execution of the idling stop function, by bringing the automobile 200 to a car dealer, or the like, equipped with the external terminal 300. Thus, the convenience of the user can be enhanced.

In this embodiment, it is determined that the battery 40 has not been replaced even when the RAM 53 is initialized, if no changes before and after the initialization appear in the characteristics of the battery 40. Accordingly, when a cable for connecting the battery 40 with the electronic control unit 50 is cut off for some reason, and then re-connected, for example, it is prevented from being erroneously determined that the battery 40 has been replaced.

Furthermore, according to this embodiment, even when the RAM 53 is not initialized, it is determined that the battery 40 has been replaced if the characteristics of the battery 40 change between the last turn-on of the ignition switch and the current turn-on of the ignition switch. Accordingly, even when the battery 40 is replaced without involving initialization of the RAM 53, the replacement of the battery 40 can be appropriately detected.

In this embodiment, when the battery 40 installed is determined as the non-designated battery, information about installation of the non-designated battery is displayed on the display 85. Accordingly, the user can be easily notified of the fact that it is erroneously determined that the non-designated battery is installed, even though the designated battery is actually connected. D. Modified Examples Modified Example 1: In the illustrated embodiment, the type of the battery 40 is determined based on the charge receiving capability of the battery 40. However, the determination factor used for determining the type of the battery 40 is not limited to the charge receiving capability. For example, the type of the battery 40 may be determined based on the internal resistance of the battery 40.

Figure 15:
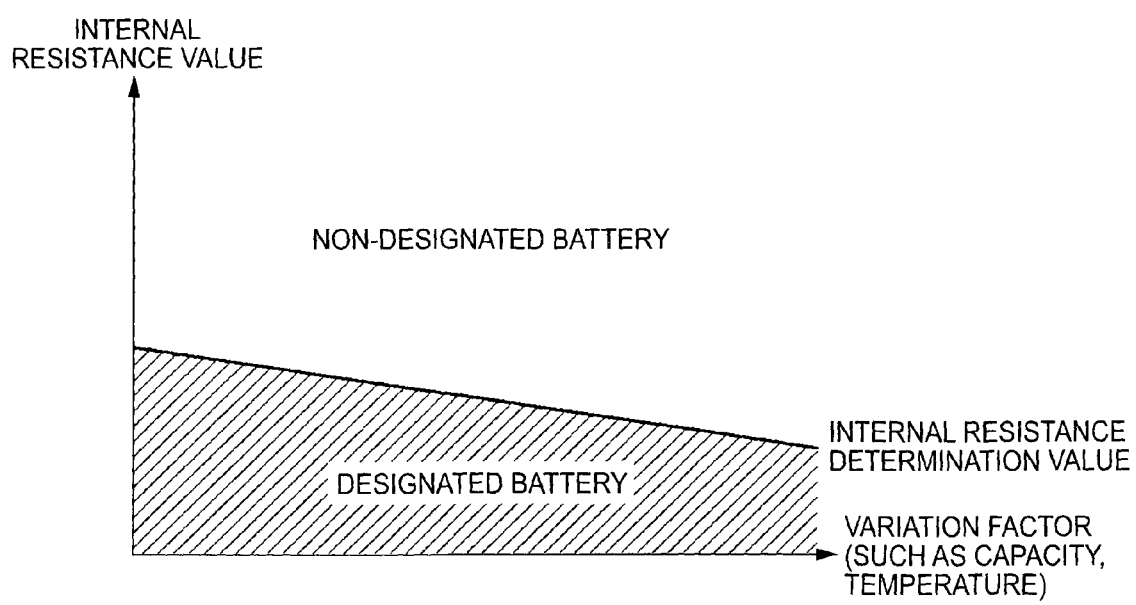
FIG. 15 is a view useful for explaining a method of determining the type of the battery based on the internal resistance.

FIG. 15 is a view useful for explaining a method of determining the type of the battery 40 based on the internal resistance. In a graph of FIG. 15, the vertical axis indicates value of a determination factor (internal resistance) used for determining the type of the battery 40, and the horizontal axis indicates a variation factor. The variation factor may be the capacity or temperature of the battery 40. The battery determining unit 55 compares the internal resistance value of the battery 40 measured in step S10 of FIG. 2, with an internal resistance determination value set in advance according to the variation factor, and determines that the type of the battery 40 is the designated battery if the internal resistance value is smaller than the internal resistance determination value. If, on the other hand, the internal resistance value is larger than the internal resistance determination value, the battery determining unit 55 determines that the type of the battery 40 is the non-designated battery. Modified Example 2: In the illustrated embodiment, in the battery replacement detecting operation, or the battery replacement without RAM initialization detecting operation, it is determined whether the battery 40 has been replaced, based on a change in the internal resistance value of the battery 40. However, it may be determined whether the battery 40 has been replaced, based on change of the charge receiving capability or capacity of the battery 40. Modified Example 3: In the illustrated embodiment, the type of the battery 40 is determined when replacement of the battery 40 is detected. Rather, the type of the battery 40 may be determined, irrespective of whether the battery 40 has been replaced. For example, the electronic control unit 50 may determine the type of the battery 40, each time the ignition switch 89 is turned on. Modified Example 4: In the illustrated embodiment, when the battery 40 is determined as the non-designated battery, the threshold voltage value B [V] for the non-designated battery which is higher than the threshold voltage value A [V] for the designated battery is employed. On the other hand, if the battery 40 is determined as a higher-performance non-designated battery than the designated battery, a threshold voltage value B [V] for the non-designated battery which is lower than the threshold voltage value A [V] for the designated battery may be employed. In this case, the higher-performance non-designated battery than the designated battery has high-speed charging capability (charge receiving capability) that is higher than that of the designated battery, for example. Modified Example 5: In the illustrated embodiment, it is determined whether the forced permission signal is received, after detection of battery replacement and determination of the battery type are carried out, and the electronic control unit 50 may regard the designated battery as being installed if the forced permission signal is received. Rather, when the forced permission signal is received, the electronic control unit 50 may regard the designated battery as being installed, without carrying out detection of battery replacement and determination of the battery type. Namely, when the forced permission signal is received from the external terminal 300, the electronic control unit 50 may regard the designated battery as being installed, irrespective of the result of detection of battery replacement and the result of determination of the battery type. Modified Example 6: In the illustrated embodiment, one electronic control unit 50 functions as the battery characteristic measuring unit 54, battery determining unit 55, and the idling stop control unit 56. Rather, each of two or more controllers may function as one or two or more of the battery characteristic measuring unit 54, battery determining unit 55, and the idling stop control unit 56. For example, an ECO-Run ECU may function as the battery characteristic measuring unit 54 and the battery determining unit 55, and an engine ECU may function as the idling stop unit 56. In another example, an ECO-Run ECU or a brake ECU may function as an idling stop control unit 56, and another controller may function as the battery characteristic measuring unit 54 and the battery determining unit 55. The invention is not limited to the above-described embodiment and modified examples, but may be implemented with various arrangements without departing from the principle of the invention. For example, the technical features in the embodiment and modified examples corresponding to the technical features described in the SUMMARY OF THE INVENTION may be replaced or combined as needed, so as to attain a part or the whole of the above-described object, or achieve a part or the whole of the above-described effects. If any of the technical features is described as being not essential in this specification, the technical feature may be deleted as needed.

What is claimed is:

1. A control system of a vehicle, comprising:
an electronic control unit configured to:
(a) measure characteristics of a battery installed on the vehicle;
(b) determine whether the battery is a designated battery for an exclusive use in an idling stop vehicle or a non-designated battery, based on at least one of the characteristics; and
(c) determine whether an idling stop function of the vehicle is permitted to be executed, based on a threshold value of at least one of the characteristics of the battery, the threshold value being set to a first threshold value when the battery is determined as the designated battery, and set to a second threshold value that is different from the first threshold value when the battery is determined as the non-designated battery.

2. The control system according to claim 1, wherein at least one of the characteristics of the battery based on which it is determined whether the idling stop function of the vehicle is permitted to be executed includes a lowest voltage measured when an engine is started.

3. The control system according to claim 2, wherein the first threshold value of the lowest voltage used when the battery is determined as the designated battery is lower than the second threshold value of the lowest voltage used when the battery is determined as the non-designated battery.

4. The control system according to claim 2, wherein the electronic control unit is configured to obtain the lowest voltage of the battery, based on a measurement value of a sensor that measures voltage of the battery.

5. The control system according to claim 2, wherein the electronic control unit is configured to estimate the lowest voltage of the battery, based on a period of use of the battery, a frequency of execution of an automatic start function, a running distance, or an internal resistance of the battery.

6. The control system according to claim 2, wherein the electronic control unit is configured to inhibit the idling stop function from being executed, when the lowest voltage of the battery is lower than the first threshold value of the lowest voltage when the battery is determined as the designated battery, or the second threshold value of the lowest voltage when the battery is determined as the non-designated battery.

7. The control system according to claim 6, wherein the second threshold value of the lowest voltage is registered in advance in the electronic control unit, as an absolute value having no relationship with a maximum value of the lowest voltage and the lowest voltage measured immediately after battery replacement.

8. The control system according to claim 6, wherein the electronic control unit is configured to calculate the second threshold value of the lowest voltage, as a relative value related to a maximum value of the lowest voltage or the lowest voltage measured immediately after battery replacement.

9. A method of controlling a vehicle including a battery and an electronic control unit, the method comprising:
measuring, by the electronic control unit, characteristics of the battery installed on the vehicle;
determining, by the electronic control unit, whether the battery is a designated battery for an exclusive use in an idling stop vehicle or a non-designated battery, based on at least one of the characteristics; and
determining, by the electronic control unit, whether an idling stop function of the vehicle is permitted to be executed, based on a threshold value of at least one of the characteristics of the battery, the threshold value being set to a first threshold value when the battery is determined as the designated battery, and set to a second threshold value that is different from the first threshold value when the battery is determined as the non-designated battery.

10. The method according to claim 9, wherein at least one of the characteristics of the battery based on which it is determined whether the idling stop function of the vehicle is permitted to be executed includes a lowest voltage measured when an engine is started.

11. The method according to claim 10, wherein the first threshold value of the lowest voltage used when the battery is determined as the designated battery is lower than that used when the battery is determined as the non-designated battery.

12. The method according to claim 10, wherein the lowest voltage of the battery is obtained, by the electronic control unit, based on a measurement value of a sensor that measures voltage of the battery.

13. The method according to claim 10, wherein the lowest voltage of the battery is estimated, by the electronic control unit, based on a period of use of the battery, a frequency of execution of an automatic start function, a running distance, or an internal resistance of the battery.

14. The method according to claim 10, wherein the idling stop function is inhibited from being executed, when the lowest voltage of the battery is lower than the first threshold value of the lowest voltage when the battery is determined as the designated battery, or the second threshold value of the lowest voltage when the battery is determined as the non-designated battery.

15. The method according to claim 14, wherein the second threshold value of the lowest voltage is registered in advance as an absolute value having no relationship with a maximum value of the lowest voltage and the lowest voltage measured immediately after battery replacement.

16. The method according to claim 14, wherein the second threshold value of the lowest voltage is calculated as a relative value related to a maximum value of the lowest voltage or the lowest voltage measured immediately after battery replacement.

* * * * *